United States Patent [19]

Kawashima

[11] Patent Number: 5,185,831
[45] Date of Patent: Feb. 9, 1993

[54] OPTICAL WAVEGUIDE DEVICE

[75] Inventor: Hisao Kawashima, Tokyo, Japan

[73] Assignee: NEC Corporation, Tokyo, Japan

[21] Appl. No.: 876,022

[22] Filed: Apr. 30, 1992

[30] Foreign Application Priority Data

Apr. 30, 1991 [JP] Japan .................. 3-099036

[51] Int. Cl.$^5$ .................. G02B 6/10; G02F 1/025
[52] U.S. Cl. .................. 385/41; 385/11
[58] Field of Search .................. 385/11, 40–42

[56] References Cited

U.S. PATENT DOCUMENTS

| 4,220,395 | 9/1980 | Wang et al. | 385/11 |
| 4,697,868 | 10/1987 | Thanivavarn | 385/11 |
| 4,762,384 | 9/1988 | Hegarty | 385/11 |
| 4,775,214 | 10/1988 | Johnson | 385/11 |
| 4,886,332 | 12/1989 | Wolfe | 385/11 |
| 4,952,014 | 8/1990 | Lieberman | 385/11 |
| 5,031,983 | 7/1991 | Dillon, Jr. et al. | 385/11 |
| 5,058,971 | 10/1991 | Schmitt et al. | 385/11 X |
| 5,117,469 | 5/1992 | Cheung et al. | 385/11 |

OTHER PUBLICATIONS

Y. Tanisawa et al., "Low Drive Voltage and Low Loss ... Waveguide Switches", 1st Microoptics Conference 1987, pp. 106–109.

Primary Examiner—Akm E. Ullah
Attorney, Agent, or Firm—Sughrue, Mion, Zinn, Macpeak & Seas

[57] ABSTRACT

A TE polarization absorption film is provided on an optical waveguide between an ouput end of the optical waveguide and a directional coupler composed of the optical waveguide and another optical waveguide. In accordance with the presence of the TE polarization absorption film, a difference of output light power between polarization components becomes minimized.

4 Claims, 1 Drawing Sheet

5,185,831

OPTICAL WAVEGUIDE DEVICE

FIELD OF THE INVENTION

This invention relates to an optical waveguide device, and more particularly to, an optical waveguide device having polarization independent property.

BACKGROUND OF THE INVENTION

In accordance with the practical application of optical communication systems, more highly advanced optical communication systems with large capacity and multi-functions have been required in these days. Functions such as the high speed generation of light signals, the change-over, the switching, etc. of light transmission paths are also required to be added to these systems. In a practical system, light signals are generated by directly modulating current injected into a semiconductor laser as a light emitting device. In accordance with this direct modulation, however, there are disadvantages in that high speed modulation more than several GHz is difficult to be obtained due to relaxation oscillation, etc., and that it is difficult to be applied to a coherent light transmission system due to the fluctuation of wavelength.

In order to overcome these disadvantages, a method in which an external modulator is used has been proposed. Especially, an optical modulator of waveguide type which is structured by waveguides fabricated in an electrooptic crystal substrate has advantages for the purpose in that size is small, efficiency is high, and response is fast.

On the other hand, an optical switch has been used for the purpose of changing-over light transmission paths, or switching light signals in a network system. The optical switch which has been practically used is of a structure in which a prism, a mirror, or an optical fiber, etc. is mechanically moved to switch light transmission paths. However, the mechanically operating optical switch has disadvantages in that operation speed is low, and size is large to result in the difficulty of realizing a matrix-patterned system.

In order to overcome these disadvantages, an optical switch of waveguide type using optical waveguides has been developed. This optical switch which is based on electrooptic effect has advantages in that response speed is high, a number of switch devices can be integrated, and reliability is high. Especially, an optical switch using a ferroelectric material such as a $LiNbO_3$ crystal, etc. has characteristics that light absorption is small to provide low loss, efficiency is high for large electrooptic effect, and so on.

As apparatus of this kind, an optical control device such as an optical directional coupler type modulator or switch, a total reflection type optical switch, Mach Zehnder type optical modulator, etc. has been reported.

The high density integration of waveguide type optical switches has been researched and developed in these days, and has been described in "OQE88-147, the electronic information and communication engineering society" by Hiroshi Nishimoto, et al. In this report, a 8×8 matrix optical switch of waveguide type which is obtained by 64 switch devices integrated on a $LiNbO_3$ substrate has been explained to provide the switching of light signals by the provision of 8 inputs and 8 outputs. On the other hand, an optical device composed of a single optical switch device such as an external optical modulator has been also researched and developed to improve its characteristics. Far such an optical switch device, parameters such as switching voltage (power), cross talk, light distinction ratio, loss, switching speed, stabilization of operation on surrounding atmosphere such as temperature, humidity, etc. are very important.

One type of a conventional optical switch comprises two waveguides having a portion of a directional coupler provided on a $LiNbO_3$ substrate by thermal diffusion of Ti thereinto, and two control electrodes provided through a buffer layer on the portion of the directional coupler. The detail of the conventional optical switch will be explained in more detail later.

However, the conventional optical switch has a disadvantage in that an output level is fluctuated dependent on polarization of an input light signal. In other words, a power of an output light signal supplied from an output port is different between TE mode and TM mode, because a complete coupling length is different between the two modes. This is caused by the fluctuation, etc. among process batches, even if the directional coupler is fabricated to provide the same coupling length between TE and TM modes by controlling fabricating conditions.

SUMMARY OF THE INVENTION

Accordingly, it is an object of the invention to provide a waveguide type optical device in which a constant power of light output signal is obtained independently of polarization of an input light signal.

According to the invention, a waveguide type optical device, comprises:

a plurality of optical waveguides provided on a substrate;

electrodes provided above the optical waveguides;

a buffer layer interposed between the substrate and the electrodes; and a TE polarization absorption film provided on an output end of at least one of the optical waveguides, the TE polarization absorption film having an equivalent refractive index approximately equal to an equivalent refractive index for TE polarization light propagated through the optical waveguides.

BRIEF DESCRIPTION OF THE DRAWINGS

This invention will be explained in more detail in conjunction with appended drawings, wherein.

DESCRIPTION OF THE PREFERRED EMBODIMENT

Figure 1:
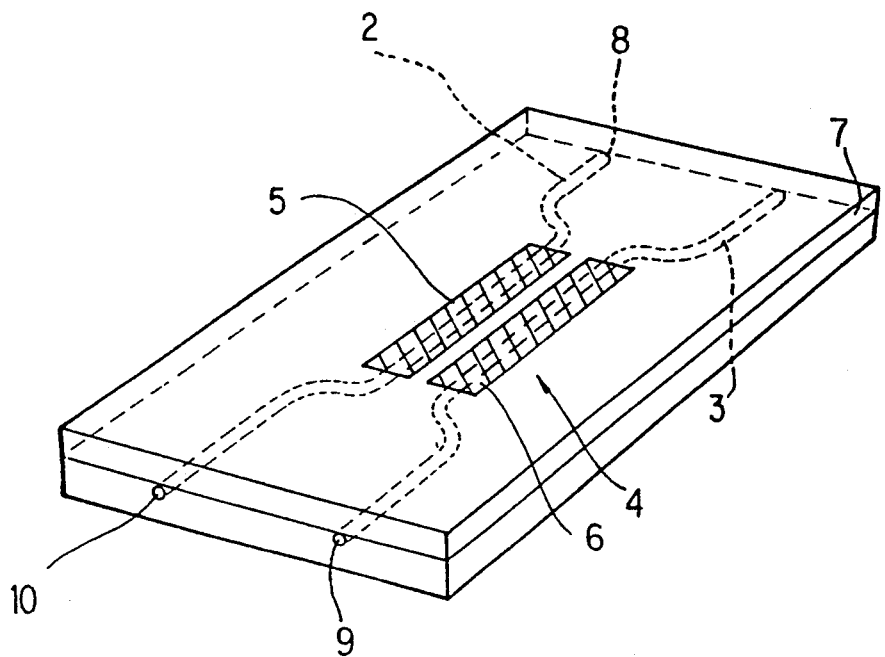
FIG. 1 is a schematic perspective view showing a conventional waveguide type optical devise.

Before describing a waveguide type optical device of a preferred embodiment according to the invention, the conventional waveguide type optical switch will be again explained in FIG. 1.

In the conventional waveguide type optical switch, waveguides 2 and 3 having a refractive index higher than that of a $LiNbO_3$ substrate are provided thereon by thermally diffusing Ti into the $LiNbO_3$ substrate 1. These waveguides 2 and 3 are proximate to provide a directional coupler 4, above which control electrodes 5 and 6 are provided. Between each of the electrodes 5 and 6 and the substrate 1, a buffer layer 7 is interposed.

In operation, when no voltage is applied across the electrodes 5 and 6, an input light signal supplied to an input port 8 is propagated through the waveguide 2 to be coupled at the directional coupler 4 to the waveguide 3, so that an output light signal is supplied from a first output port 8. A length of the directional coupler 4 is set to realize such shift of light power from the waveguide 2 to the waveguide 3. This length is defined "a complete coupling length". On the other hand, a predetermined voltage is applied across the control electrodes 5 and 6, the refractive index of the waveguides 2 and 3 is changed, so that no shift of light power occurs at the directional coupler 4. As a result, an input light signal supplied to the input port 8 is obtained at a second output port 10. This waveguide type optical switch is structured, such that the complete coupling length is equal between TE and TM modes to provide polarization independent property. In fact, however, the aforementioned disadvantage occurs in the conventional waveguide type optical switch.

Figure 2:
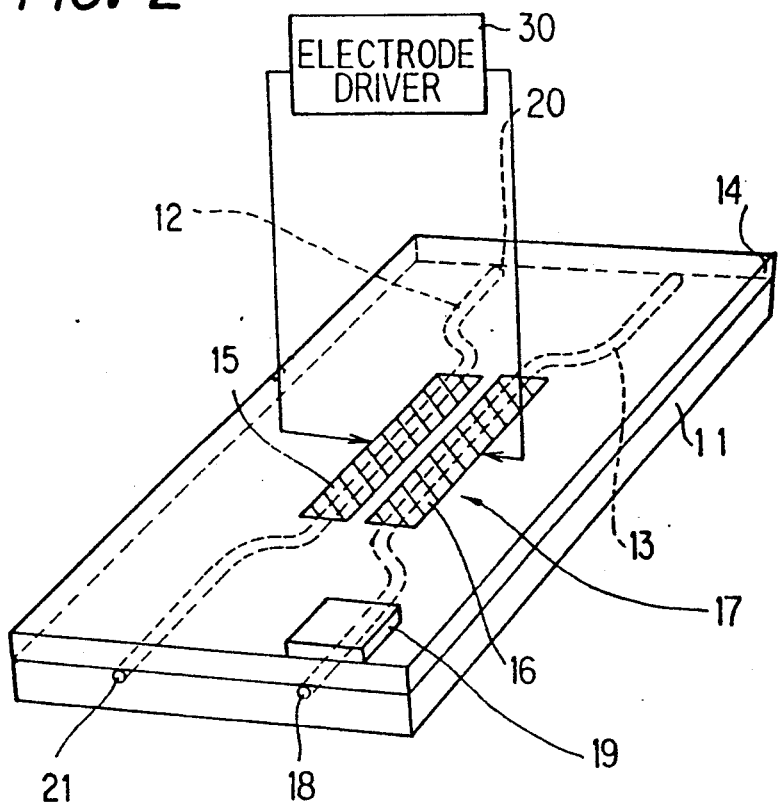
FIG. 2 is a schematic perspective view showing a waveguide type optical device of a preferred embodiment according to the invention.

Next, a waveguide type optical switch of a preferred embodiment according to the invention will be explained in FIG. 2.

In this waveguide type optical switch, waveguides 12 and 13 having a proximate portion functioning as a directional coupler 17 are provided on a LiNbO$_3$ substrate 11 by thermally diffusing Ti into the LiNbO$_3$ substrate 11. In accordance with the diffusion of Ti into the LiNbO$_3$ substrate 11, the waveguides 12 and 13 have a refractive index higher than that of the LiNbO$_3$ substrate 11. Above the waveguides 12 and 13 of the directional coupler 17 are provided control electrodes 15 and 16 supplied with a predetermined voltage applied thereacross from an electrode driver 30. Between the electrodes 15 and 16 and the waveguides 12 and 13 of the directional coupler 17 are interposed a buffer layer 14 having a refractive index lower than that of the waveguides 12 and 13. This buffer layer 14 is formed by SiO$_2$ and functions avoiding the absorption of TE mode which usually occurs at the waveguides 12 and 13 made of metal.

The waveguide type optical switch is structured in the preferred embodiment, such that a length of proximate waveguides 12 and 13 at the directional coupler 17 is equal to a complete coupling length for TE polarization, and is longer than a complete coupling length for TM polarization. Further, the waveguide type optical switch comprises a TE polarization absorption film 19 having a thickness of 1000Å which is provided through the buffer layer 14 on the waveguide 13 at the light output end thereof between a first output port 18 and the directional coupler 17. This TE polarization absorption film 17 is preferably of silicon Si, and has an equivalent refractive index approximately identical to a transmission refractive index of the waveguide 13 for TE polarization, so that a light signal of TE polarization which is propagated through the waveguide 13 is only shifted to the TE polarization absorption film 19. In this preferred embodiment, the TE polarization absorption film 19 has a length, by which a difference of waveguide loses between polarization components is compensated.

In operation, when no voltage is applied across the control electrodes 15 and 16 by the electrode driver 30, an input light signal supplied to an input port 20 is obtained as an output light signal at a first output port 18, as described in the conventional waveguide type optical switch. On the other hand, when a predetermined voltage is applied across the control electrodes 15 and 16 by the electrode driver 30, an input light signal supplied to an input port 30 is obtained as an output light signal at a second output port 21, as also described in the conventional waveguide type optical switch.

Especially in this operation, light of TE polarization in the output light signal to be supplied from the first output port 18 to a following stage is shifted to the TE polarization absorption film 19. The shifted amount of TE polarization light is determined by the thickness of the buffer layer 14, the transmission refractive index of the TE polarization absorption film 19, and an operation length which is defined to be common in principle to a complete coupling length for the directional coupler 17. As the operation length becomes long, the shifted amount of TE polarization light becomes large. Accordingly, the TE polarization absorption film 19 is provided to be longer than a predetermined length, by which a difference of output light power between TM and TE polarizations becomes zero, and is than cut repeatedly by a short length. In cutting the TE polarization absorption film 19, the output light power is monitored to check a difference between TM and TE modes. At the time when the difference becomes zero, it is determined that the TE polarization absorption film 19 becomes the predetermined length which will be a length for designing the waveguide type optical switch. The degree of phase alignment in this TE polarization shift depends on the degree of coincidence between equivalent refractive indices of the TE polarization absorption film 19 and the waveguide 13.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

WHAT IS CLAIMED IS

1. A waveguide type optical device, comprising:
  a plurality of optical waveguides provided on a substrate;
  electrodes provided above said optical waveguides;
  a buffer layer interposed between said substrate and said electrodes; and
  a TE polarization absorption film provided on an output end of at least one of said optical waveguides, said TE polarization absorption film having an equivalent refractive index approximately equal to an equivalent refractive index for TE polarization light propagated through said optical waveguides.

2. A waveguide type optical device, according to claim 1, wherein:
  said TE polarization absorption film has a length for compensating a difference of waveguide loses between polarization components.

3. a waveguide type optical device, according to claim 1, wherein;
  said substrate is of LiNbO$_3$;
  said optical waveguides are obtained by thermally diffusing Ti into said LiNbO$_3$ substrate;
  said buffer layer is of SiO$_2$; and
  said TE polarization absorption film is of Si.

4. A waveguide type optical device, according to claim 1, wherein:
  said optical waveguides has a proximate portion to provide a directional coupler, whereby said optical device functions as an optical switch.

* * * * *